F. L. SEHNERT & G. J. McMANUS.
PIPE CONNECTION.
APPLICATION FILED DEC. 26, 1908.

960,204.

Patented May 31, 1910.

WITNESSES:
Ernest Leisury
LaVera Miller

INVENTORS
Fred L. Sehnert
George J. McManus
BY
Edward V. Hardway
ATTORNEY

UNITED STATES PATENT OFFICE.

FRED L. SEHNERT AND GEORGE J. McMANUS, OF HOUSTON, TEXAS, ASSIGNORS OF NINETY-FIVE ONE-HUNDREDTHS TO SAID McMANUS AND FIVE ONE-HUNDREDTHS TO SAID SEHNERT.

PIPE CONNECTION.

960,204.

Specification of Letters Patent. Patented May 31, 1910.

Application filed December 26, 1908. Serial No. 469,401.

*To all whom it may concern:*

Be it known that we, FRED L. SEHNERT and GEORGE J. McMANUS, citizens of the United States, residing at Houston, in the county of Harris and State of Texas, have invented certain new and useful Improvements in Pipe Connections, of which the following is a specification.

Our invention relates to new and useful improvements in pipe connections, and more particularly to that class of such connections as are adapted to be used to connect pipe sections composed of metal or other hard material.

The invention comprehends a plurality of pipe sections, each provided with joint-members, said members being so formed as to readily unite with each other; and means for securing the union of said members.

The object of the invention is to provide a connection of the character described, which will impart flexibility to pipes, composed of a plurality of sections, joined by our improved connection, irrespective of the inflexible nature of the material of which the sections of said pipe is composed; and it will be observed, that by disposing said connections, so that they will operate at varying angles to each other, a flexible pipe is provided, and the prime object of the invention attained.

A further feature of the invention resides in the novel construction and arrangement of the co-acting parts of the connections, by reason of which, the pipe or hose may be moved, or bent in any direction without any constriction of the internal-passage-way through said pipe; and a still further, and important feature of the invention resides in the construction of the connection, whereby any internal pressure upon said connection, outwardly, operates to hold the joint-members the more securely together, thereby providing a hose specially adapted to withstand great internal pressure and at the same time to be flexible. A pipe so constructed is specially adapted to be used for connecting railway cars and to take the place of the rubber hose connection now in common use.
Finally, the object of the invention is to provide a device of the character described, that will be easily constructed, simple, easily taken apart and united together, and one which will be efficient and easily kept in working order.

Figure 1:
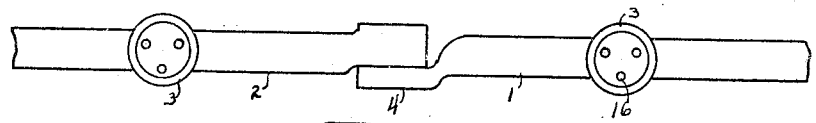
Figure 2:
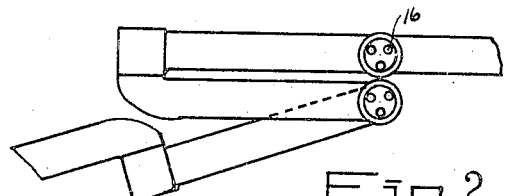
Figure 3:
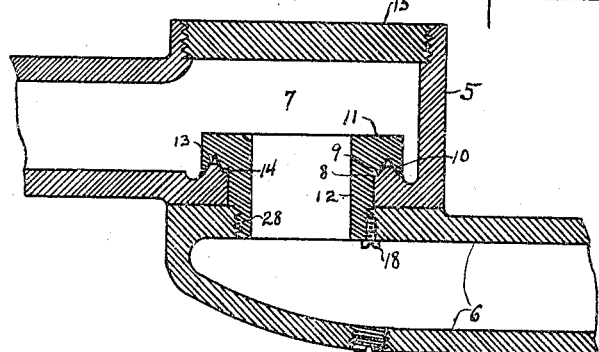
Figure 4:
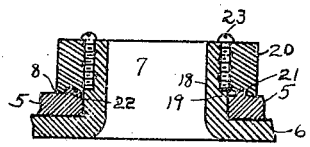
Figure 5:
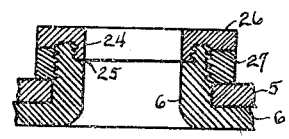

With the above and other objects in view, our invention has particular relation to certain novel features of construction and operation, an example of which is given in this specification, which we do declare to be an exact, clear and complete description of our invention, reference being had to the drawings, and the numerals of designation marked thereon, which are made a part hereof, and wherein, Figure 1 is a longitudinal side elevation of several sections of the pipe, connected. Fig. 2, is a modified form of the device shown in Fig. 1. Fig. 3 is a longitudinal sectional view through one of the connections, while Figs. 4 and 5 are modifications of the form of connections shown in Fig. 3.

The only substantial difference between the forms shown in Figs. 1 and 2, consists of the elimination, in Fig. 2, of the bends, or shoulders, shown in the sections of Fig. 1. In the form shown in Fig. 2, each section of the pipe is capable of performing a complete rotation around the joint or coupling, while the sections of a pipe constructed as shown in Fig. 1 would be capable of only a partial rotation around said connection, the shoulder of one section coming into contact with the other section, and preventing a complete rotation thereof.

Referring now more particularly to the drawings, wherein like numerals of reference designate similar parts in each of the figures, the numerals 1 and 2 designate a number of sections. These sections are joined by suitable connections or joints 3 and 4, the joints 3 operating, preferably, at right angles to the joint 4. As the sections are formed of metal or some other suitable hard material, it is apparent that a flexible pipe is provided, and it is further obvious that the said pipe is movable in various directions, and may be formed of any desired number of sections and joints, the same being of any desired length and size.

Referring to joint 4 of Fig. 1, which is of substantially the same construction as all of the other joints, it is to be observed that this joint is substantially cylindrical in shape, one portion or joint-member 5 being formed on the section 2 and the corresponding joint-member 6 being formed on the section 1, each joint-member being cylindrical in shape and being approximately equal to the other joint member. The joint-member 5 is provided with a central opening 7 surrounded by ground seat 8. This ground seat 8 is provided with a truncated and ground flange 9 which is adapted to engage in a triangular ground groove 10 carried by the overlapping rim 11 of sleeve 12. This sleeve 12 is cylindrical in shape and is designed to be passed snugly through the cylindrical opening 7, and is threaded at its lower end so as to engage the thread 28 of joint-member 6. The groove 10 is carried upon the under side of the overlapping rim 11 and the flange 9 being truncated a small triangular vacant space 13 is left in the apex of groove 10 which may be filled with a lubricant, such as graphite composition, which will serve the dual purpose of lubricating the joints and of assisting in making the same air tight. This space is also gradually taken up by the wear upon the ground surface of the flange, and the connection thus rendered air tight for a great length of time; and spaces 14 are left between the rim 11 of the sleeve 12, and the joint member 2, to allow the sleeve to continue to fit closely down upon flange 9 as the same wears away.

A screw-threaded cap 15 is provided for permitting access to the component parts of the joints and is screwed into joint-member 5 as is shown in Fig. 3. This cap is provided with suitable recesses 16 for engaging with a wrench, or other instrument, which may be used in unscrewing the same, and is preferably flat surfaced so that the joints will not be cumbersome.

A cap screw 17 is provided for joint-member 6 and is alined with the threads of the sleeve 12. This cap-screw is provided for the purpose of permitting the insertion of a tap screw 18 which is designed to be screwed into a tapped hole directly through the threads between the sleeve 12 and the threaded portion of joint member 6 into which said sleeve screws.

The extreme sections are designed to be attached to the usual angle cock (not shown) in any suitable manner and a complete flexible coupling thus provided which operates, for all practical purposes the same as the flexible couplings now in common use.

In Figs. 4 and 5 we have shown fragmentary views of slightly modified forms of our joint connections. In Fig. 4 the joint member 6 is provided with an upstanding nipple 18 integral therewith, and extending up through the central opening 7 of joint member 5. This upstanding nipple is provided upon its periphery with threads 19 for receiving ring nut 20. This ring nut 20 is ground smooth on its underside and is provided on said underside with a circular ground groove 21 for receiving a corresponding circular ground flange 22 which is carried upon the ground seat 8 of joint-member 5, thus forming a ground joint which will prevent the escape of air or liquid from the inside but which will allow the members to swing freely upon one another. In this Fig. 4 we have shown a capstan screw 23 which is placed in a tapped hole directly through the threads between the upstanding nipple and the ring nut 20. This screw is provided for the purpose of securely locking said ring nut 20 against rotation. Fig. 5 shows an upstanding nipple whose function is the same as the upstanding nipple shown in Fig. 4. In this figure 24 designates an internal sleeve which is provided with threads to engage with threads on the upstanding nipple. These threads are made on the shouldered part 25, and the nipple is so shouldered that when the sleeve 24 is screwed thereon the face of the sleeve and the nipple will be flush with each other and a smooth surface will thus be provided which will not obstruct the passage of any liquid through the cylindrical opening 7. The said sleeve is provided with an overlapping rim 26 which is designed to act as a lock on ring nut 27 which corresponds to ring nut 20 in Fig. 4.

A flexible pipe constructed of sections which are united by means of the connections herein set forth will be not only compact and practical but will be found to be capable of resisting great internal pressure, and will be found to be very efficient, as a substitute for the rubber hose, which is now in common use in railroad car couplings and will be found useful wherever power is to be transmitted through hose or tubing; and the joints or connections will not be so cumbersome or so liable to disconnection as the couplings now in common use.

What we claim is:—

1. In a coupling of the character described the combination with a plurality of sections of a joint member carried by each section; a tubular connecting member projecting through one of said joint members and having a threaded engagement at one end with the other of said joint members, an overhanging shoulder carried by the free end of said connecting member for engaging with the first mentioned member, said shoulder having a circular ground groove upon the under side thereof; a circular truncated ground flange carried by said first mentioned joint member and coinciding with and fitting said groove, said groove being of such a depth as to only partially embrace the flange and a removable cap for permitting access to the interior of said coupling.

2. In a coupling of the character described, the combination with a plurality of sections of a joint member carried by each section; a tubular connecting member having a threaded engagement at one end with one of said members and projecting through the wall of the other of said members in such a manner as to provide an unrestricted passage way between the interior passage ways of the said sections; an annular outwardly extending flange carried by the free end of said connecting member and adapted to engage with the said wall of the last mentioned joint member, said flange being provided upon its under side with a circular ground groove; an upstanding truncated ground flange carried by said wall and projecting into said groove; a removable cap carried by said last mentioned joint member for permitting access to the interior of said coupling; a means for securing said coupling member against detachment from its joint member and means for permitting the insertion of the last mentioned means.

3. In a coupling of the character described, the combination with a plurality of sections of a joint member carried by each section; a tubular connecting member having a threaded engagement at one end with one of said members and projecting through the wall of the other of said members in such a manner as to provide an unrestricted passage way between the interior passage ways of the said sections; an annular outwardly extending flange carried by the free end of said connecting member and adapted to engage with the said wall of the last mentioned joint member, said flange being provided upon its under side with a circular ground groove; an upstanding truncated ground flange carried by said wall and projecting into said groove; a removable cap carried by said last mentioned joint member for permitting access to the interior of said coupling; a top screw for securing said coupling member against detachment from its joint member and a removable screw cap carried by said joint member for permitting the insertion of said securing screw.

4. In a coupling of the character described the combination with a plurality of sections of a joint member carried by each section; a connecting member projecting through one of said joint members and having engagement at one end with the other of said joint members, an overhanging shoulder carried by the free end of said connecting member for engaging with the first mentioned member, said shoulder having a circular ground groove upon the under side thereof; a circular truncated ground flange carried by said first mentioned joint member and coinciding with and fitting said groove, said groove being of such a depth as to only partially embrace the flange, and a removable cap for permitting access to the interior of said coupling.

5. In a coupling of the character described, the combination with a plurality of sections of a joint member carried by each section; a connecting member having detachable engagement at one end with one of said members and projecting through the wall of the other of said members in such a manner as to provide an unrestricted passage way between the interior passage ways of the said sections; an annular outwardly extending flange carried by the free end of said connecting member and adapted to engage with the said wall of the last mentioned joint member, said flange being provided upon its under side with a circular ground groove; an upstanding truncated ground flange carried by said wall and projecting into said groove; a removable cap carried by said last mentioned joint member for permitting access to the interior of said coupling; a means for securing said coupling member against detachment from its joint member and means for permitting the insertion of the last mentioned means.

6. In a coupling of the character described, the combination with a plurality of sections of a joint member carried by each section; a connecting member having engagement at one end with one of said members and projecting through the wall of the other of said members in such a manner as to provide an unrestricted passage way between the interior passage ways of the said sections; an annular outwardly extending flange carried by the free end of said connecting member and adapted to engage with the said wall of the last mentioned joint member, said flange being provided upon its under side with a circular groove; an upstanding flange carried by said wall and projecting into said groove; a removable cap carried by said last mentioned joint member for permitting access to the interior of said coupling; a tap screw for securing said coupling member against detachment from its joint member and a removable screw cap carried by said joint member for permitting the insertion of said securing screw.

7. In a coupling of the character described the combination with a plurality of sections of a joint member carried by each section; a tubular connecting member projecting through one of said joint members and having engagement at one end with the other of said joint members, an overhanging shoulder carried by the free end of said connecting member for engaging with the first mentioned member, said shoulder having a circular ground groove upon the under side thereof; a circular truncated ground flange carried by said first mentioned joint member and coinciding with and fitting said groove, and a removable cap for permitting access to the interior of said coupling.

8. In a device of the character described, the combination with two fluid conducting coupling members having flat contacting faces, of a flange carried by one of said coupling members, a coupling sleeve threaded into the other of said coupling members and projecting into the first coupling member, said sleeve being formed with an outwardly projecting flange overlapping the flange carried by said coupling member, the contacting faces of said flanges being provided with intermeshing means, and a locking screw which pierces the wall of said sleeve and enters the second mentioned coupling member to thereby bind said sleeve against movement with relation to said coupling member, the outwardly projecting flange of the coupling sleeve extending substantially from wall to wall of the first named coupling member and said screw extending upwardly into said sleeve, and a removable cap threaded within the first named coupling member above said sleeve.

In testimony whereof, we have signed our names to this specification in the presence of two subscribing witnesses.

FRED L. SEHNERT.
GEORGE J. McMANUS.

Witnesses:
CHAS. R. MUNGER,
WM. A. CATHEY.